United States Patent
Paul et al.

(10) Patent No.: US 9,925,693 B2
(45) Date of Patent: Mar. 27, 2018

(54) METHOD FOR REMOVING VOLATILE COMPONENTS FROM ELASTOMER-CONTAINING MEDIA AND DEGASSING DEVICES THEREFOR

(71) Applicant: LANXESS International SA, Granges-Paccot (CH)

(72) Inventors: Hanns-Ingolf Paul, Leverkusen (DE); Joerg Kirchhoff, Cologne (DE); Udo Wiesner, Bornheim (DE); Luc Timmermans, Ghent (BE); Nicolai Dieltiens, Ghent (BE)

(73) Assignee: ARLANXEO Deutschland GmbH, Dormagen (DE)

( * ) Notice: Subject to any disclaimer, the term of this patent is extended or adjusted under 35 U.S.C. 154(b) by 255 days.

(21) Appl. No.: 14/782,043

(22) PCT Filed: Apr. 4, 2014

(86) PCT No.: PCT/EP2014/056858
§ 371 (c)(1),
(2) Date: Oct. 2, 2015

(87) PCT Pub. No.: WO2014/161997
PCT Pub. Date: Oct. 9, 2014

(65) Prior Publication Data
US 2016/0023376 A1    Jan. 28, 2016

(30) Foreign Application Priority Data

Apr. 4, 2013 (EP) ...................................... 13001716

(51) Int. Cl.
*B29B 7/84* (2006.01)
*B29B 7/48* (2006.01)
(Continued)

(52) U.S. Cl.
CPC .......... *B29B 7/845* (2013.01); *B01D 19/0036* (2013.01); *B29B 7/481* (2013.01);
(Continued)

(58) Field of Classification Search
None
See application file for complete search history.

(56) References Cited

U.S. PATENT DOCUMENTS 3,254,367 A    6/1966  Erdmenger
3,501,807 A    3/1970  Selbach
(Continued)

FOREIGN PATENT DOCUMENTS

DE    623903 A    7/1936
DE    3431063 C2    3/1985
(Continued)

OTHER PUBLICATIONS

Translation of JP2003039527A, accessed Aug. 14, 2017.*
(Continued)

*Primary Examiner* — Amber R Orlando
*Assistant Examiner* — Phillip Shao

(57) ABSTRACT

The invention relates to a method for degassing elastomer-containing media, such as elastomer solutions and dispersions in particular, and degassing devices (1) for carrying out said method.

20 Claims, 9 Drawing Sheets

(51) Int. Cl.
  *B29B 7/74* (2006.01)
  *B29C 47/08* (2006.01)
  *B29C 47/40* (2006.01)
  *B29C 47/60* (2006.01)
  *B29C 47/76* (2006.01)
  *B01D 19/00* (2006.01)
  *C08F 114/16* (2006.01)
  *B29C 47/66* (2006.01)

(52) U.S. Cl.
  CPC ............ *B29B 7/483* (2013.01); *B29B 7/7495* (2013.01); *B29C 47/0844* (2013.01); *B29C 47/0861* (2013.01); *B29C 47/402* (2013.01); *B29C 47/408* (2013.01); *B29C 47/6056* (2013.01); *B29C 47/767* (2013.01); *C08F 114/16* (2013.01); *B29C 47/663* (2013.01)

(56) References Cited

U.S. PATENT DOCUMENTS

| | | | |
|---|---|---|---|
| 4,055,001 A | 10/1977 | Forster et al. | |
| 4,556,324 A | 12/1985 | Tynan | |
| 5,487,602 A * | 1/1996 | Valsamis | B29B 7/465 366/81 |
| 5,785,908 A | 7/1998 | Bott et al. | |
| 6,024,479 A | 2/2000 | Haering | |
| 6,811,294 B1 | 11/2004 | Elsner et al. | |
| 7,284,897 B2 | 10/2007 | Blach | |
| 7,981,340 B2 | 7/2011 | Sturm et al. | |
| 8,388,216 B2 | 3/2013 | Lechner et al. | |
| 8,783,939 B2 | 7/2014 | Blach | |
| 8,979,355 B2 | 3/2015 | Bierdel et al. | |
| 9,022,639 B2 | 5/2015 | Burkhardt | |
| 9,023,983 B2 | 5/2015 | Paul et al. | |
| 9,061,452 B2 | 6/2015 | Blach | |
| 9,512,240 B2 | 12/2016 | Kirchhoff et al. | |
| 9,688,002 B2 | 6/2017 | Bierdel et al. | |
| 9,738,770 B2 | 8/2017 | Kirchhoff et al. | |
| 2001/0031289 A1* | 10/2001 | Maris | B29C 47/38 425/204 |
| 2001/0056176 A1 | 12/2001 | Takami et al. | |
| 2006/0245294 A1 | 11/2006 | Burkhardt | |
| 2011/0184089 A1* | 7/2011 | Bierdel | B29B 7/481 523/348 |
| 2015/0203600 A1 | 7/2015 | Kirchhoff et al. | |
| 2015/0218335 A1* | 8/2015 | Kirchhoff | C08J 11/20 521/44.5 |

FOREIGN PATENT DOCUMENTS

| | | | |
|---|---|---|---|
| DE | 102004010553 A1 | 9/2005 | |
| EP | 1127609 A2 | 8/2001 | |
| JP | 59048136 A2 | 3/1984 | |
| JP | 2003039527 A * | 2/2003 | ......... B29C 47/6012 |

OTHER PUBLICATIONS

International Search Report from International Application No. PCT/EP2014/056858, dated Jul. 10, 2014, 3 pages.

Bravo, V.L. et al., Numerical Simulation of Pressure and Velocity Profiles in Kneading Elements of a Co-Rotating Twin Screw Extruder, Poymer Engineering and Science, Feb. 2000, vol. 40, No. 2, pp. 525-541.

Hagberg, Comparison of solution rubber finishing processes—parts I and II, Process Machinery, Mar. 2000, pp. 17-19, p. 23, pp. 28-30.

Lechner, Frank, "Degassing Polymer Melts with Co-Rotating Twin Screw Extruders", Fundamentals, Technology, and Applications, 2007, Carl Hanser Verlag GmbH & Co, Abstract.

* cited by examiner

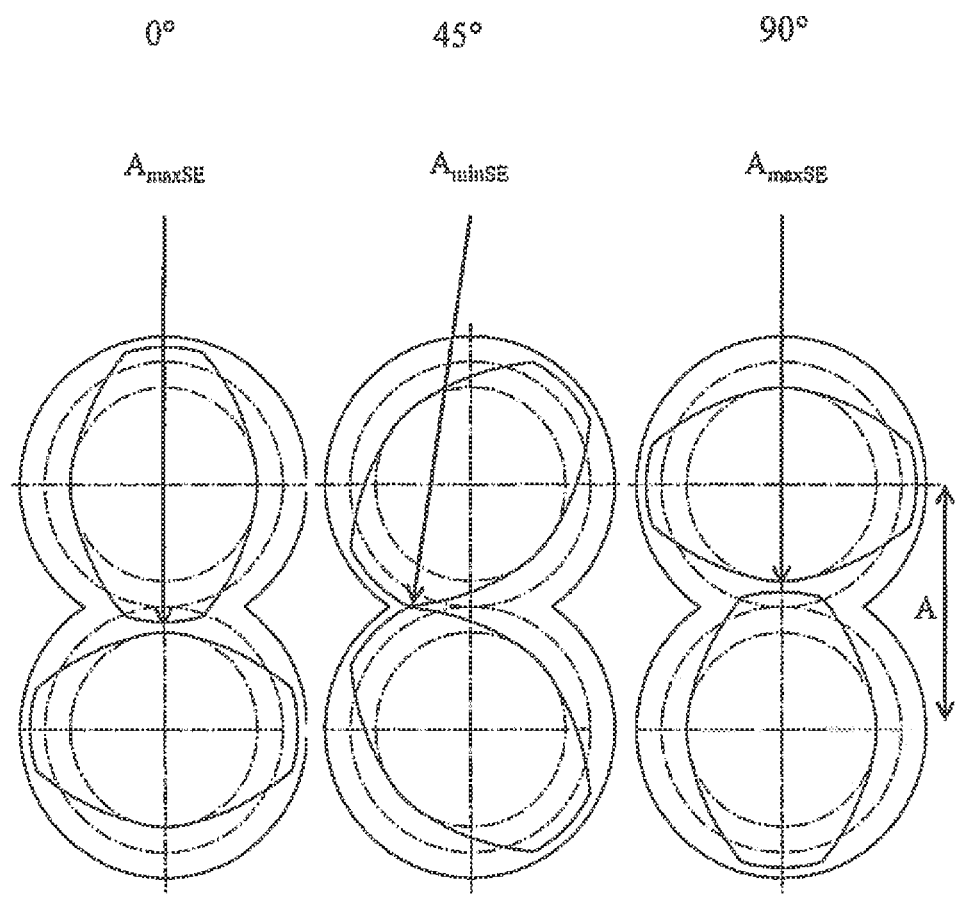

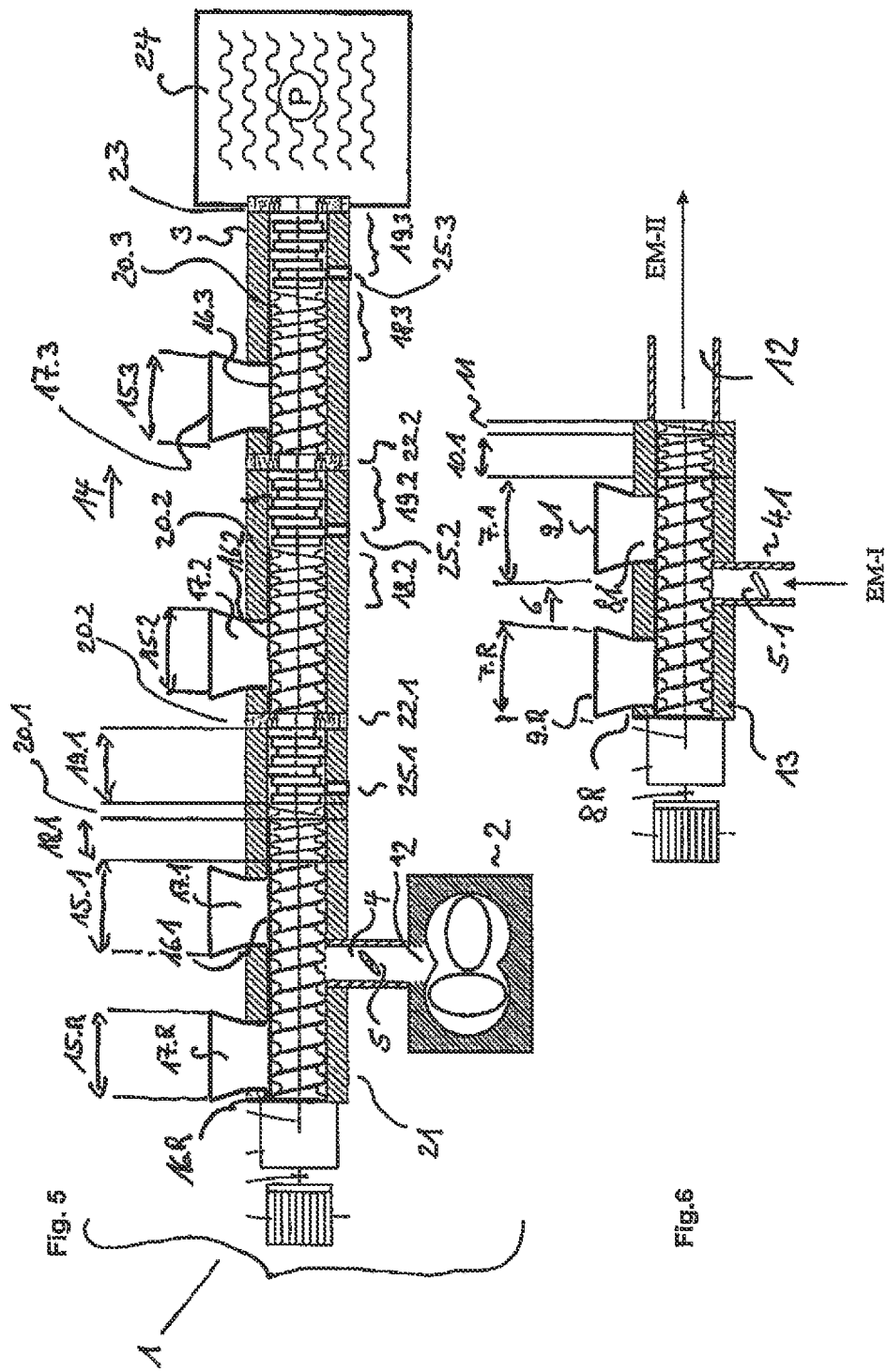

METHOD FOR REMOVING VOLATILE COMPONENTS FROM ELASTOMER-CONTAINING MEDIA AND DEGASSING DEVICES THEREFOR

The invention relates to a method for degassing media containing elastomers, such as, in particular, elastomer solutions and dispersions, as well as degassing devices for carrying out the above-mentioned method.

BACKGROUND INFORMATION

Extrusion is a frequently used method for the production, treatment and processing of polymers. Here and in the following, extrusion is understood to refer to the treatment of a medium in a single- or multi-screw extruder.

Extrusion is employed industrially in the production of polymers for the removal of volatile components such as monomers and oligomers, as well as auxiliary agents and solvents from media containing polymers ([1], p. 192 to 212; [1]=Klemens Kohlgrueber, Twin-Screw Extruders, Hanser Publishers, Munich 2007). If required, the polymer can also be chemically modified during extrusion, such as by grafting, modification of functional groups or by modifying the molecular weight, by targeted buildup or reduction of the molecular weight, or the polymer can be converted, e.g. by admixing additives.

The advantages of the extrusion must be weighted against the disadvantage that a particularly high amount of energy is dissipated into the polymer-containing media to be extruded, particularly in the ridge areas of the screw elements typically used as treatment elements in extruders, which may lead to intense local overheating. Such local overheating may damage the product, e.g. by changes in the smell, color or chemical composition, or lead to the development of inhomogeneities in the product such as gel bodies or specks.

Damage patterns of various polymers due to local overheating are referred to, for example, in WO2009/153000 A and described on p. 22, line 7, to p. 24, line 25.

In particular, rubber types such as polybutadiene (BR), natural rubber (NR), polyisoprene (IR), butyl rubber (IIR), chlorine butyl rubber (CIIR), bromobutyl rubber (BIIR), styrene butadiene rubber (SBR), chloroprene rubber (CR), butadiene-acrylonitrile rubber (NBR), partly hydrogenated butadiene-acrylonitrile rubber (HNBR) and ethylene propylene diene copolymers (EPDM) tend to interlink and develop a gel if the temperature is too high, which results in a massive deterioration of the mechanical characteristics of the products produced from these. Where chlorine butyl rubber and bromobutyl rubber, as well as chloroprene rubbers are involved, increased temperatures may lead to the release of hydrogen chloride or hydrogen bromide, which, in turn, catalyzes further disintegration of the polymer.

The reaction speed of any damage to the polymer depends on the temperature. The reaction rate constant k(T) for this may be described using Arrhenius' equation:

$$k(T)=A^* \exp(-E_A/(R^*T)).$$

In this equation, k is the reaction rate constant, T is the absolute temperature in [K], A is the frequency factor, $E_A$ is the activation energy in [J/mol] and R is the universal gas constant in [J/(mol*K)].

As well, from an energy-related point of view, methods for the extrusion of media containing polymers should therefore generally be designed in such a way that the average temperature increase is as low as possible, and local temperature peaks, as they occur, for example, in the ridge areas of a screw element with a traditional Erdmenger screw profile in accordance with the current state of technology, are avoided.

It is still advantageous, particularly for the removal of volatile components from media containing polymers, such as solvent residues or water, to attain a high degree of surface renewal via the screw geometry, which facilitates the removal of volatile components.

A number of approaches to addressing the solution of these problems are to be found in the prior art.

A twin-shaft screw machine with single-start treatment and screw elements is known from DE 1 180 718 A. In a sectional view, the outside contour of the screw elements is composed of arcs. The active edge positioned in the direction of rotation has an outside contour composed of three arcs whose centers are either on the external radius or on the longitudinal axis of the screw elements. One disadvantage is that the screw elements allow only a small amount of flexibility for adjusting the shear and/or elongation flow affecting the material to be processed.

WO2009/152968 and WO2011/039016 disclose treatment methods for extruders, such as, in particular, screw elements, which generate a lower degree of energy input into the materials containing polymers during extrusion due to their rounded shape.

A treatment system and a method for degassing bimodal polyolefins are known from EP 1 617 985 A1. Two parallel moving twin-shaft extruders are arranged consecutively in the treatment system, wherein the second extruder, viewed in the direction of flow, has a degassing zone to degas the polyolefins to be processed. The disadvantage of this treatment system is that the degassing performance, i.e. the extent of the degassed proportion of undesired volatile components, is low.

A method and a system for processing strongly degassing materials are known from EP 0861717 A1. The extrusion device has a main extruder and two secondary extruders opening into this at the side, so that the gas current developing in a vaporization zone of the main extruder is separated into at least three partial flows, which are then discharged from the extruders.

EP 1 127 609 A2 discloses a method for removing volatile components from a medium containing polymers using a kneader. Here, the energy is partly introduced via the kneader wall and is used to vaporize the solvent. In addition, energy, as mechanical energy, is introduced by the rotating shaft of the kneader. The introduction of mechanical energy via the kneader is heavily dependent on the viscosity of the product, which reduces flexibility and thus the attractiveness of the method for industrial application markedly.

EP 1 165 302 A1 discloses a device and a method for degassing plastics, comprising a rear degassing zone and multiple degassing zones in the direction of flow, which are operated under a vacuum. The vacuum is required to obtain low residue concentrations of volatile components.

The direct degassing of rubber solutions using a flash tank and one or more extruders is disclosed in "Process Machinery", Part I and II, March and April 2000; Author: C. G. Hagberg, as well as in WO2010/031823 A and PCT/EP2011/054415.

U.S. Pat. No. 4,055,001 discloses a method for producing polymers such as butyl rubber with a water content of less than 0.1% w/w, using ultrasound sonotrodes during the drying process. The extremely high shear impact due to ultrasound, however, is not favorable for commercial application.

US 2001/056176 A1 discloses a single-step method for concentrating rubber solutions. Here, the rubber solution is heated with steam in order to remove existing solvents in one step by degassing under a vacuum, generating white crumbs. In the process, US 2001/056176 A1 requires a large volumetric steam flow to remove volatile components at low steam pressure and this leads to the undesired inclusion of additional water inside the crumbs. Screw elements for treating polymer melts are known from EP 0 764 076A, which, even at low temperatures, are intended to contribute to the dynamic kneading of such melts during extruder operation due to their asymmetrical geometries.

The abovementioned approaches to solutions, however, cannot be transferred to the extrusion of media containing elastomers or can be improved upon.

A method for degassing media containing polymers, including, in particular, polymer melts, polymer solutions and dispersions, together with degassing devices for performing the abovementioned method, wherein the screw geometry must fulfill certain geometric requirements in order to obtain an improved degassing result, is known from PCT/EP2012/069201. The task underlying the invention was to provide a method for removing volatile components from media containing elastomers, which enables a high degassing capacity combined with a high elastomer throughput while simultaneously resulting in a low residual volatile component content.

SUMMARY OF THE INVENTION

The object of the invention is a device, which is particularly suitable for removing volatile compounds from media containing elastomers and which has at least one extruder, which, in turn, comprises at least the following:

a housing and n housing bores $B_n$, with corresponding bore diameters $D_n$, where n is a whole number between 2 and 16, preferably between 2 and 12, particularly preferably between 2 and 8, and most preferably 2, and wherein the housing bores run through one another and are preferably arranged parallel to one another, and n shafts $W_n$, which can be driven to rotate in the same direction and each of which is arranged concentrically in one of the housing bores $B_n$, each of which has a rotational axis $A_n$ and each of which is provided with at least one treatment element whose cross-sectional profile, in the peripheral direction, has:

m relative maxima $R^m_{max\ n}$ in respect of the radial extension of the cross-sectional profile of the treatment element to the rotational axis $A_n$ of the shaft $W_n$, where m is a whole number between 1 and 16, preferably between 1 and 8, particularly preferably 1, 2, 3 or 4, more preferably 1, 2 or 3, and most preferably 2 or 3, wherein, in addition, at least one relative maximum $R^m_{max\ n}$ is an absolute maximum of the radial extension $R_{max\ n}$ in respect of the radial extension of the cross-sectional profile of the treatment element to the rotational axis $A_n$ of the shaft $W_n$, wherein the following applies to $R_{max\ n}$:

$R_{maxn} <= (D_n/2)$, at least one feed zone, one or more degassing zones, each comprising at least one degassing vent, which is suitable for discharging volatile components from a medium containing elastomers from the extruder, at least one discharge zone, wherein the extruder has screw elements SE as treatment elements, which are designed in such a way that at least the following condition is met:

S1) The clearance $A_{SE}$ between the profiles of the screw elements of two shafts, which can be driven to rotate, each of which is arranged concentrically in adjacent housing bores $B_n$ and $B_{n+1}$, running through one another, in the cross-sectional profile and where the shafts rotate 360° in the same direction, is:

i) between 0.001 and 0.2 $A_D$; in a different embodiment, between 0.005 and 0.05 $A_D$, where $A_D$ is the clearance of the rotational axes of the two adjacent shafts, which can be driven to rotate, ii) and has at least one absolute minimum $A_{minSE}$ and an absolute maximum $A_{maxSE}$, where $A_{maxSE} \geq 1.3\ A_{minSE}$, preferably $A_{maxSE} \geq 1.5\ A_{minSE}$, more preferably $\geq 5.0\ A_{minSE}$, and particularly preferably $\geq 10.0\ A_{minSE}$, and, in another embodiment, $A_{maxSE}$ is between 1.3 and 10 $A_{minSE}$, preferably between 1.5 and 8.0, and particularly preferably between 1.5 and 5.0.

It is clear to the expert that, due to condition i), $A_{maxSE}$ cannot be greater than 200 $A_{minSE}$.

Preferably, the following condition is met, as well:

S2) The cross-sectional profile of the screw elements in respect of the radial extension of the profile curve has at least one absolute maximum $R_{max\ n}$, to which the following applies: $0.420\ D_n < R_{max\ n} < 0.496\ D_n$, preferably $0.420\ D_n < R_{max\ n} < 0.490\ D_n$, preferably $0.430\ D_n < R_{max\ n} < 0.485\ D_n$, more preferably $0.440\ D_n < R_{max\ n} < 0.482\ D_n$, and particularly preferably $0.450\ D_n < R_{max\ n} < 0.480\ D_n$.

BRIEF DESCRIPTION OF THE DRAWINGS

FIG. 2c depicts an arrangement of screw profiles in accordance with the invention generated from an Erdmenger profile with a reduced tip diameter wherein $A_{maxSE}$ and $A_{minSE}$ vary during rotation.

FIG. 5 depicts an extruder of a degassing device in accordance with the invention in longitudinal section with an upstream pre-extruder in cross-section.

FIG. 6 depicts the upstream pre-extruder of FIG. 5 in longitudinal section.

DESCRIPTION OF THE EMBODIMENTS

In addition to the explicitly cited characteristics and combinations of features, the scope of the invention also includes any combination of preferred ranges specified for each feature.

In the context of the invention, cross-sectional profile refers to the profile of a treatment element, in particular, a screw element in a plane orthogonal to the rotational axis $A_n$ of the shaft, on which the treatment element is arranged.

The term screw element includes both the module construction model usually employed today, consisting of a core shaft and screw elements, which have both a locating socket for the core shafts and screws in a solid construction, e.g. in a one-piece form, screw shafts consisting of individual subsegments, which are produced as a solid construction, or combinations of the abovementioned construction modes.

Housing bores running through one another in accordance with the invention are bores, which create a joint cavity over their entirety in cross-sectional profile, at least over a longitudinal segment of the extruder.

Figure 1:
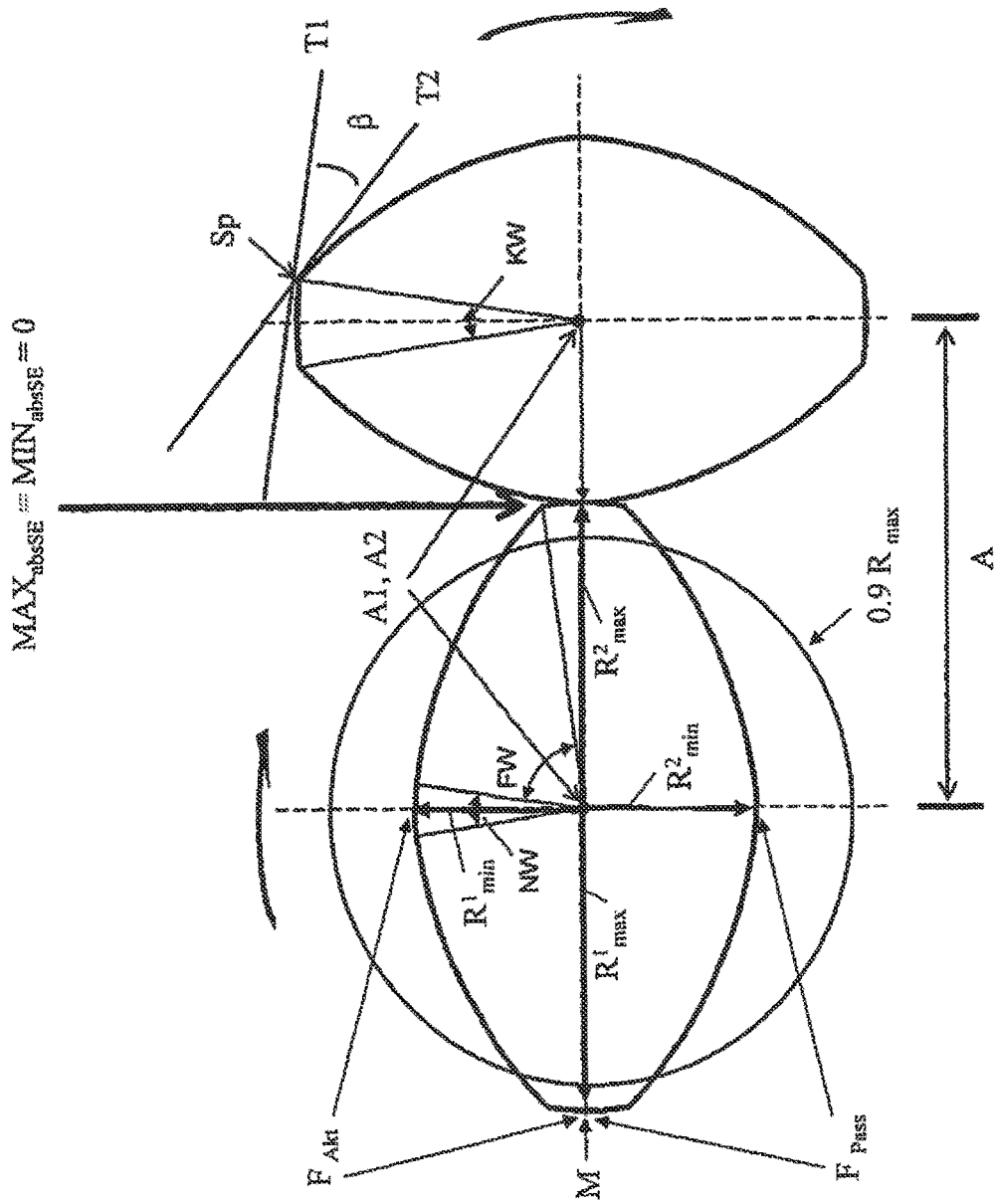
FIG. 1 depicts a classic, so-called double-start Erdmenger profile for an intermeshing twin-screw extruder.
Figure 2A:
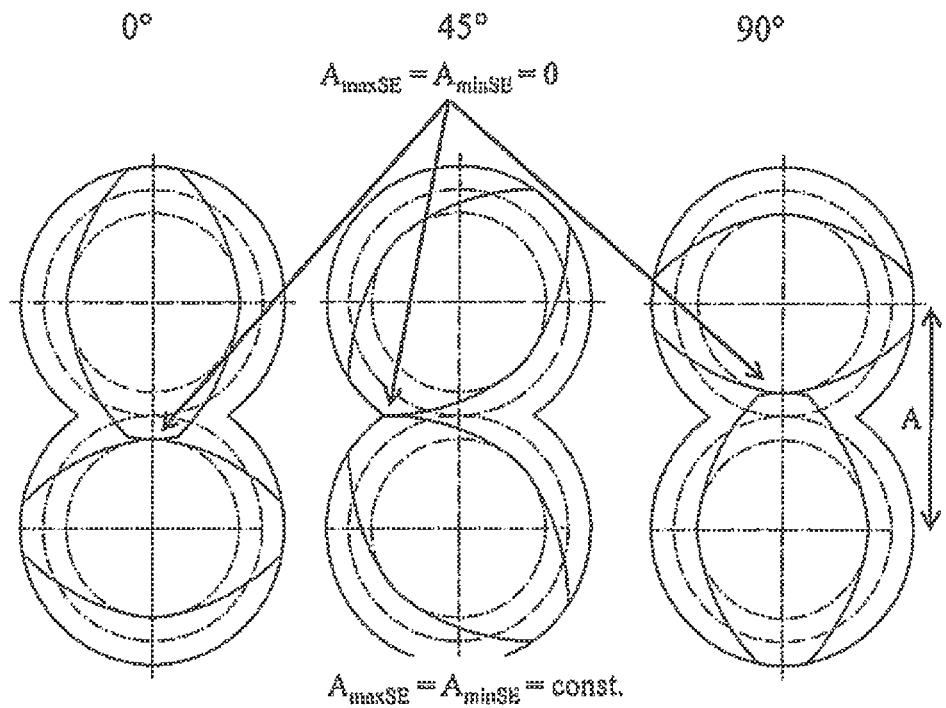
FIG. 2a show the clearance $A_{SE}$ for the arrangement of FIG. 1 for the rotation of the shafts wherein the clearances $A_{maxSE}$ and $A_{minSE}$ are constant and each equal to 0.
Figure 2B:
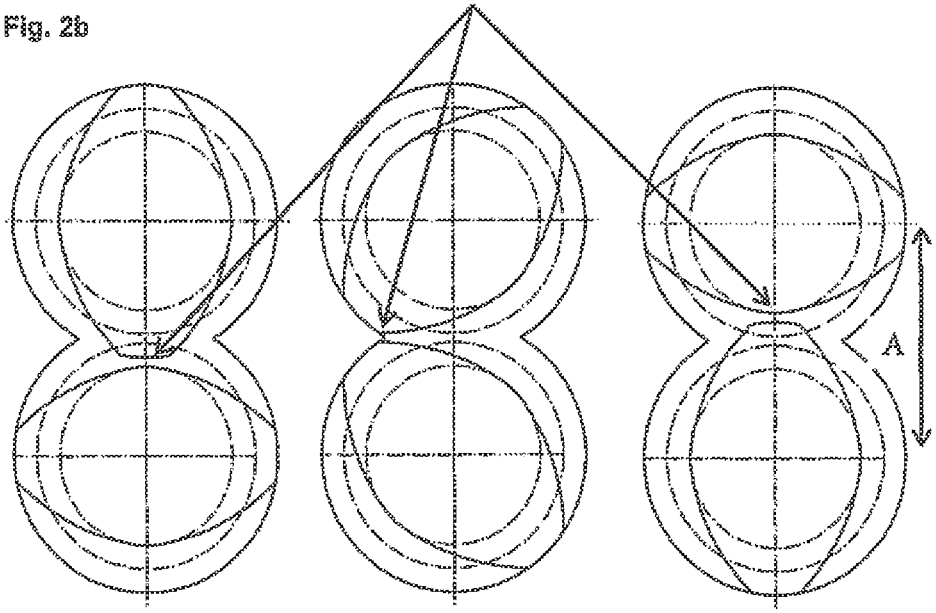
FIG. 2b depicts an arrangement of Erdmenger profiles related to that of FIG. 2a, wherein, however, the distance $A_D$ between the rotational axes is increased, $A_{maxSE}$ and $A_{minSE}$ are constant and are each greater than 0.

The abovementioned geometric conditions are described by reference to a classic so-called double-start Erdmenger profile for an intermeshing twin-screw extruder as depicted in FIGS. 1, 2a and 2b. The Erdmenger profile, for example, has two relative maxima $R^1_{max}$ and $R^2_{max}$, in the region of the screw ridges, each of which, at the same time, also has the maximum value $R_{max}$, with respect to the radial extension of the cross-sectional profile to the rotational axes A1 and A2.

In the literature as well as in this document, screw elements with p relative maxima $R^p_{max}$, each of which have at least 85%, preferably at least 95%, of the maximum value $R_{max}$ with respect to the radial extension of the cross-sectional profile to the rotational axis $A_n$ of the shaft $W_n$, are also referred to as a p-start screw profile.

In the context of this invention, the active edges toward the front, relative to the direction of rotation, are those areas of the cross-sectional profile of the screw elements from one relative maximum $R^m_{max\,n}$ to the next relative minimum in the direction of rotation $R^m_{min\,n}$ with reference to the radial extension of the cross-sectional profile to the rotational axis $A_n$ of the shaft $W_n$. If the relative $R^m_{max\,n}$ or the relative minimum $R^m_{min\,n}$ is a single point, this point, by definition, is neither part of the active edge ($F_{akt}$) nor of the passive edge ($F_{pass}$). The same is true for the center point M (center as defined) of a ridge area, which, for example, has a plateau-like relative maximum across a ridge angle KW with regard to the function $R(\varphi)$ of the screw profile, where $\varphi$ is the angle of the rotational axis A1 or A2 in the direction of rotation. In this case, as depicted in FIG. 1, the area between the center of the plateau-like maximum and the endpoint of the relative maximum in the direction of rotation of the screw element is also part of the active edge $F_{akt}$ by definition. The endpoint of the relative maximum in the direction of rotation of the screw element in the Erdmenger profile depicted in FIG. 1 is the intersection Sp.

By way of example, FIG. 1 also gives the radius as 0.9 $R_{max}$, which indicates that the intersection Sp of the ridge and edge arc is outside this radius, i.e. between 0.9 $R_{max}$ and $R_{max}$, and creates a bend in the profile, which creates an edge on the screw element. The tangents T1 of the ridge arc and T2 of the edge arc are also indicated in FIG. 1, as well as the smaller angle β, formed by the tangents T1 and T2, which is about 34° for the Erdmenger profile depicted.

The arrangement of Erdmenger profiles depicted in FIG. 1 is fully self-cleaning. The clearance $A_{SE}$ depicted for this arrangement in FIG. 2a for the rotation of the shafts A1 and A2 in the same direction with the angles 0°, 45° and 90° is constant and is 0, i.e. the clearances $A_{maxSE}$ and $A_{minSE}$ are each also equal to 0, i.e. the feature S1) is not complied with. The maximum radial extension of the cross-sectional profile of the treatment element is $R_{max}=(D_n/2)=29$ mm, i.e. the feature S2), also described in the literature as the radial clearance, is also not complied with. Here, the clearance of the rotational axes $A_D$ of the two adjacent rotary drivable shafts A1 and A2 is 48 mm. The expert is aware that, in practice, a constant clearance $A_{maxSE}$ that is not 0 is normally used to avoid mechanical damage to the rotating parts.

Figure 3:
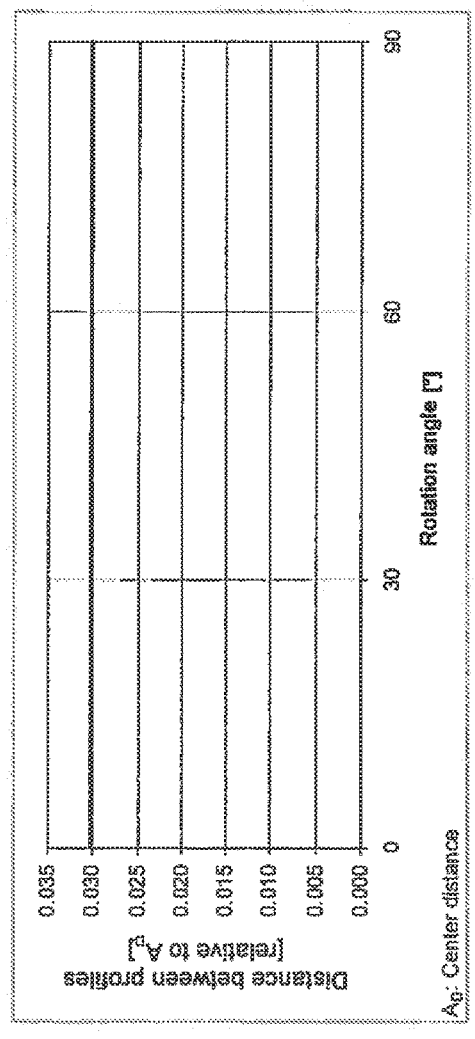
FIG. 3 provides a graphical representation of the distance between profiles during rotation of shafts A1 and A2 for the profiles of FIGS. 2a and 2b.

FIG. 2b depicts an arrangement of Erdmenger profiles as depicted in FIG. 2a, wherein, however, the distance $A_D$ between the rotational axes A1 and A2 has been increased by 1.5 mm, to 49.5 mm, in order to obtain some clearance between the screw elements. Here, the maximum radial extension of the screw elements $R_{max}=(D_n/2)$ is also 29 mm. The clearance $A_{SE}$ remains constant when the rotation of the shafts A1 and A2 in the same direction is 360° and has an average value of approximately 0.03, in relation to the center distance $A_D$. The course of the clearance $A_{SE}$ is described in FIG. 3 with reference to a rotational angle of 0 to 90°. Due to the symmetry of the elements, the course is repeated for the subsequent quarter turns. The characteristics S1) and S2) are not complied with in the arrangement according to FIG. 2a.

Figure 4:
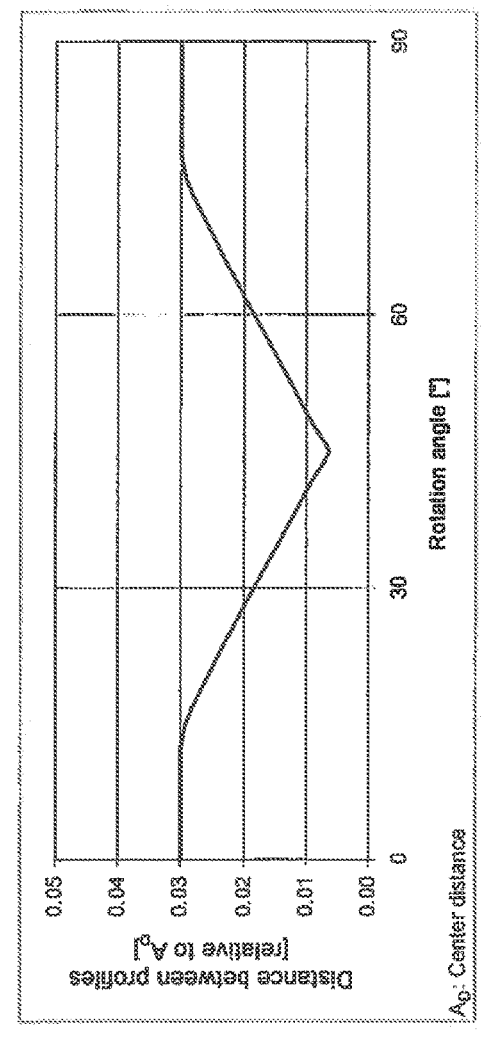
FIG. 4 provides a graphical representation of the distance between profiles during rotation of shafts A1 and A2 for the profile of FIG. 2c.

FIG. 2c depicts an arrangement of screw profiles in accordance with the invention generated from an Erdmenger profile with a reduced tip diameter. The distance $A_{SE}$ varies where the shafts A1 and A2 rotate 360° in the same direction. The course of the clearance $A_{SE}$ is depicted in FIG. 4 for a rotational angle of 0 to 90°. Due to the symmetry of the elements, this course is also repeated for the subsequent quarter turns. $A_{maxSE}$ is 1.45 mm or 0.03 $A_{D\,D}$ $A_{minSE}$ is 0.31 mm or 0.0064 $A_{D\,D}$. $A_D$ is 48 mm. $A_{maxSE}=4.7\,A_{minSE}$. The feature S1) is therefore complied with.

The reduction of the tip diameter simultaneously creates a radial clearance. The maximum radial extension of the screw elements is $R_{max}=0.4743\,D_n$. The feature S2) is therefore also complied with.

The screw profile depicted in FIG. 2c is generated from the standard Erdmenger profile, see design specification in [1]. For this purpose, by way of example, an external diameter of the contour is assumed to be 57.8 mm and the center distance to be 47.8 mm. Using this information, the profile as described in [1] is first created as a precisely abrading contour. The center distance is then increased to 48 mm (center distance increase). A circle with a radius of 27.65 mm is then drawn around the rotational axis of the profile. This circle with a radius of 27.65 mm constitutes the new external edge of the profile. In the process, the profile remains symmetrical. This is a double-start profile, and consequently, the two gears are created with the new external radius of 27.65 mm.

The geometrical design is highly flexible within the range of the conditions S1) and preferably also S2), and the expert is sufficiently familiar with methods for the construction of the respective screw elements and cross-sectional geometries to construct radial clearance and clearances $A_{SE}$ starting, for example, with a given, precisely abrading screw profile. Known methods for this are, for example, the alternatives for increasing the center distance, the longitudinal equidistants and the spatial equidistants described in sections 2.5.2 and 5 of [1]. For the increase of the center distance, a screw profile with a smaller diameter is designed and separated by the amount of clearance between the screws. For the longitudinal equidistant method, the longitudinal profile curve is offset parallel to the rotational axis of the respective element by half the clearance between the screw elements, inward, vertically to the profile curve, toward the rotational axis. For the spatial equidistant method, the screw element is reduced by half the clearance between screw and screw, in a direction vertical to the surfaces of the precisely abrading profile, starting from the spatial curve on which the screw elements are cleaned. The longitudinal equidistant and the spatial equidistant are preferred; the use of the spatial equidistant is particularly preferred.

Figure 7:
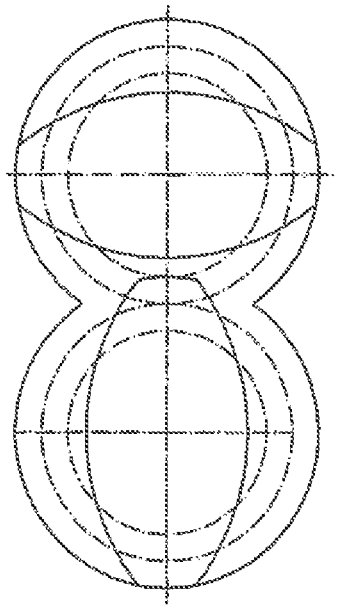
FIGS. 7 to 11 depict general alternative arrangements of screw profiles in accordance with alternative embodiments of the present invention.

By way of example, FIG. 7 to 11 also depict arrangements of screw profiles in accordance with the invention, which have been created as follows:

The basis in all cases was the precisely abrading contour in accordance with FIG. 1, with a 58 mm external diameter and a 48 mm center distance A. The construction was as described in [1]. On this basis, the following modifications were added:

FIG. 7: An arc with a radius of 46 mm was arranged in such a way that the two endpoints of the ridges of the Erdmenger profile remain intact. This created a clearance of 3.6 mm between the base of the edge and the ridge.

Figure 8:
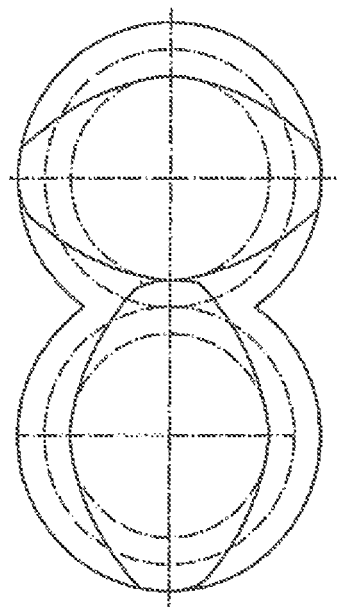

FIG. 8: The ridge was modified on one side by a circle with a radius of 13 mm. The center of this circle was on the symmetrical axis of the Erdmenger profile. The circle with a radius of 13 mm was arranged in such a way that a smooth transition to the remaining ridge of the original Erdmenger profile remained.

Figure 9:
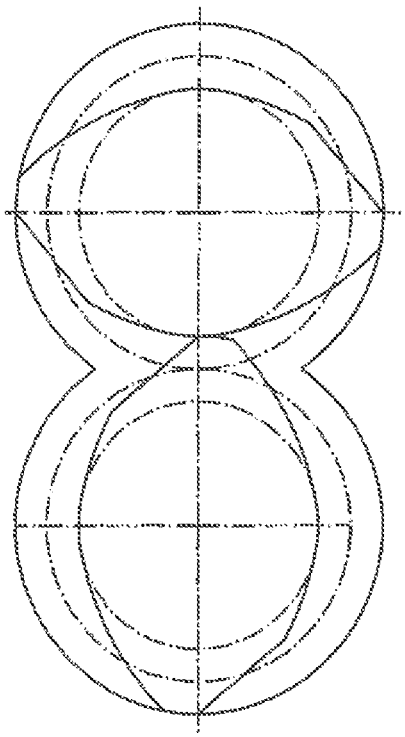

FIG. 9: Starting from the center of the ridge of the original Erdmenger profile, a straight line was drawn at an angle of 50° to the symmetry axis of the original Erdmenger profile.

Figure 10:
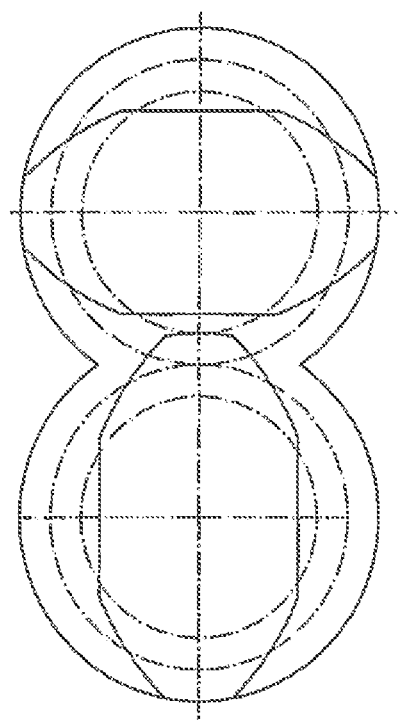

FIG. 10: A parallel line was drawn to the symmetrical axis of the original Erdmenger profile at a distance of 16 mm from the symmetrical axis. This removed part of the base of the edge and, to some extent, resulted in an increased clearance between the ridge and the base of the edge.

Figure 11:
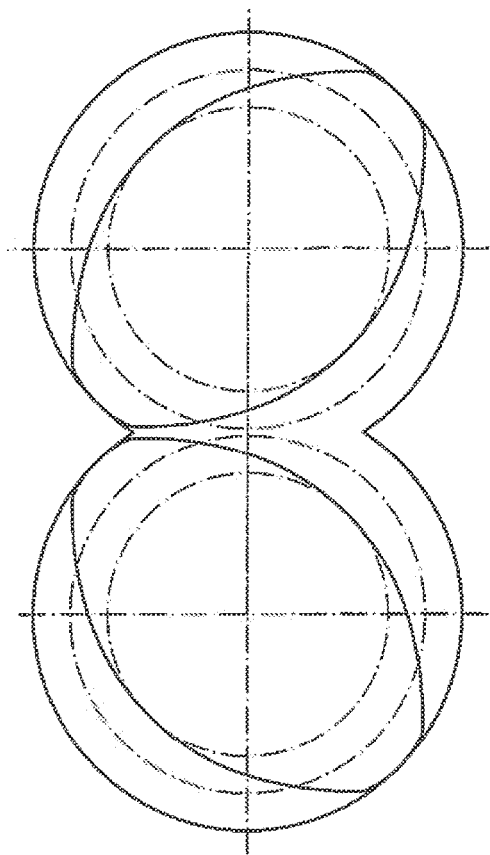
Figure 13:
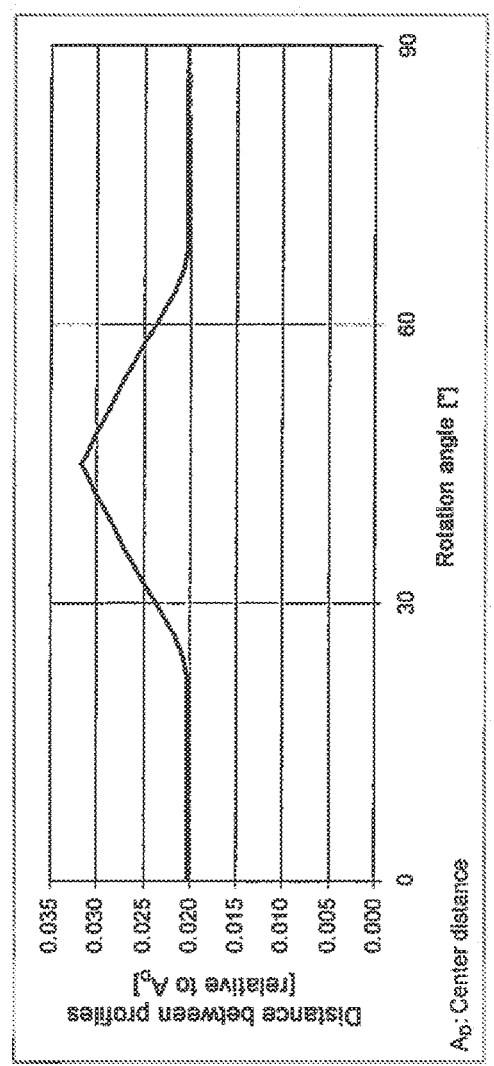
FIG. 13 provides a graphical representation of the distance between profiles during rotation of shafts A1 and A2 for the profile of FIG. 11.
Figure 12:
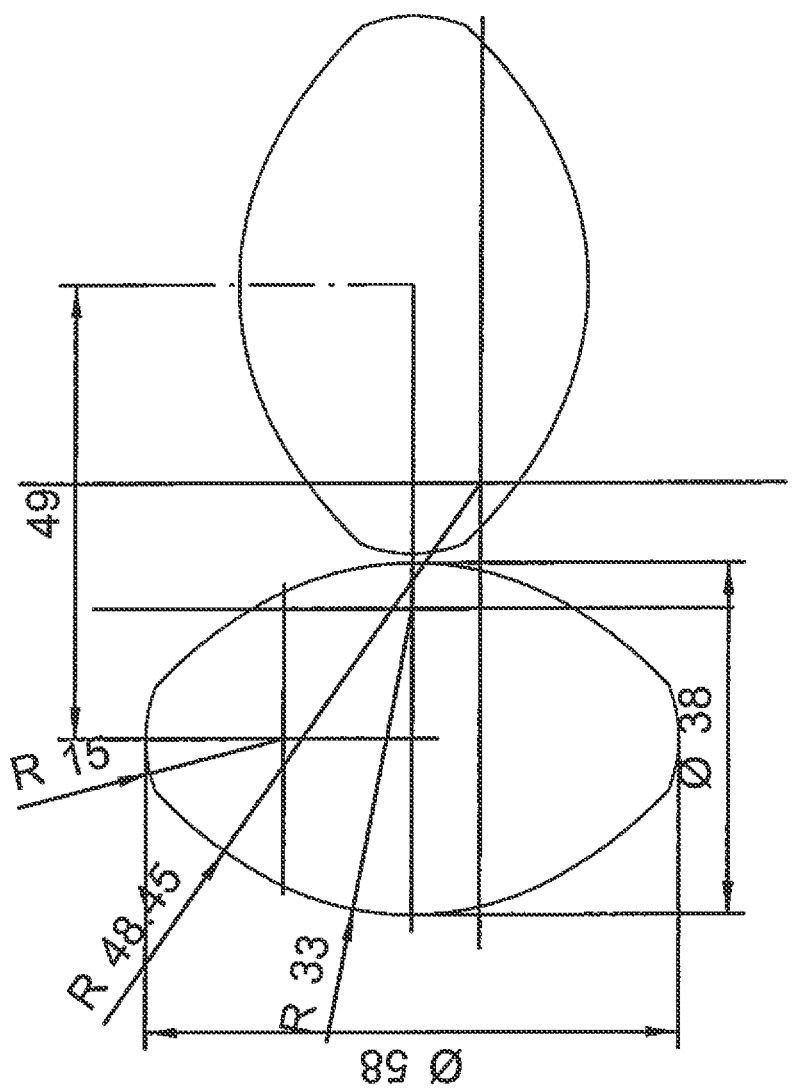
FIG. 12 provides details relating to the profile depicted in FIG. 11.

FIG. 11: The profile depicted deviates from the usual Erdmenger profile. The self-cleaning profile that is the basis was designed for a center distance of 48 mm with an external diameter of 58 mm and consists of 3 arcs per quadrant. The root radius is 33 mm in the self-cleaning profile, the edge radius is 48 mm and the tip radius is 15 mm. The root and edge the radius merge tangentially, while there is a sharp bend between the root and the tip. In order to achieve a variation of the clearance $A_{SE}$ over the peripheral direction, the center point of the edge circle was displaced by 1 mm, thus increasing the edge radius to 48.5 mm. If the center distance is additionally increased to 49 mm, this results in $A_{minSE}=0.02\ A_{D\ D}$ and $A_{maxSE}=0.032\ A_D$. $A_{maxSE}=1.6\ A_{minSE}$. This profile design is depicted in FIG. 12. $A_{SE}$ subject to the rotational angle is depicted in FIG. 13.

In accordance with the invention, screw elements can be used, whose cross-sectional profile can be fully represented by a continually differentiated profile curve as long as they comply with feature S1) and preferably also feature S2).

In further embodiments of the invention, the extruder has a housing and n=2 to 16, particularly preferably n=2 to 12 and more particularly preferably n=2 to 8 and most particularly preferably n=2 housing bores $B_n$.

The housing bores $B_n$ run through one another and are preferably arranged parallel to one another.

In accordance with the invention, suitable types of extruders comprising at least a housing and n housing bores $B_n$ with the corresponding bore diameters $D_n$, where n is a whole number between 2 and 16, particularly preferably between 2 and 12, more particularly preferably between 2 and 8, and most particularly preferably 2, and wherein the housing bores run through one another and are preferably arranged parallel to one another, are, for example, twin-screw extruders, planetary-gear extruders or ring extruders, whereby twin-screw extruders or ring extruders are preferred, and twin-screw extruders are particularly preferred. Twin-screw extruders in accordance with the invention can be driven to rotate in the same direction.

In one embodiment, the at least one extruder has, in addition, at least one dispersion zone. Stripping agents or other additives, for example, can be added to the polymer in the dispersion zone. The treatment elements in the dispersion zone can be, for example, kneading elements, sprocket blocks, serrated washers or toothed mixing elements. A possible further selection of suitable elements can be found in [1].

In the region of the active edge of a screw element, the medium containing elastomers to be extruded is pressed into a diminishing wedge as the extruder shaft $W_n$ turns in its housing bore $B_n$. Shear and elongation flows occur in the process, which, particularly during degassing in accordance with the invention, lead to a high surface renewal and thus to an improved diffusion of volatile components from the medium containing elastomers.

Surprisingly, it was found that the throughput and degassing performance of extruders can be significantly increased if screw elements complying with the feature S1), and preferably also S2), are in place in the extruder as treatment elements.

Without wishing to be scientifically bound to this, our own examination of an extruder in accordance with the invention, with a transparent housing, has shown that media containing elastomers form stringy shapes in the extruder as degassing and thus also viscosity increase. These stringy shapes are particularly well kneaded due to the varying clearance $A_{SE}$ between adjacent screw elements and preferably additional radial clearance in accordance with S2) between the screw elements and the housing wall. This ensures a particularly high degree of surface renewal and degassing.

It has been found that, despite their high degassing performance, screw elements, which comply with the feature S1) and preferably also S2), minimize the energy input so that the damage to the extruded elastomers as described above can be largely or completely avoided. Full use is made of this effect, particularly if the screw elements with the abovementioned features are used in at least one degassing zone. Preferably, at least the last degassing zone of the extruder is equipped with the corresponding screw elements. In another embodiment, all degassing zones of the extruder are equipped with the corresponding screw elements. In principle, the number of degassing zones is unlimited, and can be from 1 to 20 in the extruder, for example, preferably from 1 to 10, and particularly preferably from 2 to 8. The degassing zones are typically found downstream from the feed zone, in the direction of flow of the extruder, and arranging at least one degassing zone upstream from the feed zone in the direction of flow of the extruder (the so-called rear degassing zone) is preferred.

As the expert is aware, degassing zones typically comprise at least one degassing vent in the extruder housing leading into so-called degassing domes, which, in turn, are connected to a condenser unit via gas discharge lines, where the volatile compounds escaping from the media containing polymers are condensed. The pressure in the degassing zones and the degassing domes is preferably controlled by pumps, such as, in particular, vacuum pumps.

The volatile compounds escaping from the medium containing elastomers via the degassing vents and the degassing domes tend to pull elastomers or products with them, which, in the worst case, can result in clogging the degassing vents or the degassing domes.

For this reason, in a preferred embodiment of the invention, the degassing vents and the degassing domes are designed in such a way that they effectively prevent or reduce any leakage of media containing elastomers or products.

Suitable devices for accomplishing this objective are single- or multi-shaft, in particular, double-shaft, plug screws, which are mounted on the degassing vents and operated so as to convey material into the extruder, or rollers or belts arranged on the inside of the degassing vents to push media containing elastomers and product back into the extruder. As an alternate or in addition to the devices described above, coatings can be used on the degassing vents, which reduce or prevent any adhesion of the material to the surface. Suitable coatings are, for example, DLC (diamond-like carbon), ethylene tetrafluoroethylene (ETFE), polytetrafluoroethylene (PTFE) and nickel alloys.

The pressure in the degassing vents and degassing domes is, for example, between 1 hPa and 2,000 hPa, preferably between 5 hPa and 900 hPa.

In an alternate embodiment, screw elements are used in the degassing zones, which also meet the following conditions:

S3) The screw elements SE have a rise t for which the following applies:

1.38 $D_n < t < 5.00$ $D_n$, preferably 1.60 $D_n < t < 3.00$ $D_n$, particularly preferably 1.80 $D_n < t < 2.50$ $D_n$, and most particularly preferably 1.90 $D_n < t < 2.40$ $D_n$.

If multiple degassing zones are connected downstream from the feed zone in the direction of flow of the extruder, it is necessary to connect intermediate pressure build-up zones and preferably also accumulation elements between the individual degassing zones in order to seal the individual degassing zones off from one another and thus allow progressive degassing in the direction of flow of the extruder. In this case, the degassing zones can be operated at different, typically decreasing, pressures, in particular, in the direction of flow of the extruder.

While degassing zones are typically so-called part-filled zones with a volumetric filling level of about 0.1 to 0.6, preferably 0.3 to 0.5, a volumetric filling level of 1 is reached in the pressure build-up zones and, if required, in the accumulation element. The term used for this is fully filled zones or segments.

The treatment elements used in the pressure build-up zones can be conventional screw elements, not in accordance with the invention, with a lower rise t than in the degassing zones.

The accumulation elements used can be, for example, rear-operating elements, forward-operating elements with a small pitch, kneading blocks, accumulation plates, toothed mixing elements or generally elements with a small conveying volume.

The extruder can also have at least one dispersion zone, for example, e.g. in order to introduce stripping agents or other additives into the medium containing elastomers. Surprisingly, it was found that the dispersion in the extruder works particularly well if the at least one dispersion zone has screw elements as treatment elements, which are designed so that the following conditions are met:

S1) with the abovementioned values, including their preferred ranges and/or

S2) with the abovementioned values, including their preferred ranges and/or

S4) a rise t of 1.50 $D_n < t < 12.00$ $D_n$, preferably 1.60 $D_n < t < 10.00$ $D_n$, and particularly preferably 2.00 $D_n < t < 9.00$.

The use of screw elements in the dispersion zone complying with the features S1) and S4) or S1) and S2) is preferred; the use of screw elements in the dispersion zone complying with the features S1), S2) and S4) is particularly preferred.

If stripping agents are to be added to the medium containing elastomers to aid degassing, the preferred arrangement of the dispersion zones is in the direction of flow of the extruder and upstream of the degassing zones.

In one embodiment, tension release elements are installed, at least partially upstream of the degassing zones in the direction of flow of the extruder.

Tension release elements can, for example, be rotating or fixed perforated plates.

Perforated plates of this type are known, for example, from JP 59 048136 A, U.S. Pat. No. 3,501,807, DE 34 31 063, DE 623 903 and PCT/EP2011/062636.

The tension release elements can also be rear-feeding elements, forward-feeding elements with a very low rise, kneading blocks or accumulation plates, for example.

In one preferred embodiment, fixed perforated plates are used, which are firmly connected to the housing during operation but which can be removed and have one locating socket each to receive each shaft on hand in the extruder and which preferably serve as slide gaskets for the shafts. The radial clearance s of the receiving opening from the shaft in relation to the diameter of the housing bore D is preferably $0.001 \leq s/D \leq 0.02$, preferably $0.002 \leq s/D \leq 0.01$, and particularly preferably $0.003 \leq s/D \leq 0.006$.

The perforated plates have one or more, preferably a large number of perforated holes, wherein the hole bore diameters have a diameter d of, for example, 1 mm≤d≤6 mm, preferably 1.5 mm≤d≤5 mm, and particularly preferably 2 mm≤d≤4 mm.

In another likewise preferred embodiment, the perforated plates are designed as multi-part units, preferably in two parts, and in such a way that they can be removed from the housing without removing the shafts.

The particular advantage of using perforated plates is that the medium containing elastomers fed through the perforated plates is formed into strings in the secondary free space of the degassing zone and has a larger surface compared to the medium containing polymers prior to the nozzle plate. Volatile compounds can thus easily escape from the medium containing elastomers and can be separated from the latter.

In general, the extruder can incorporate one or more feed openings for the introduction of additives, which, in principle, can be positioned anywhere in the extruder, preferably outside the degassing zones and preferably in the dispersion zones, if in place.

Examples of additives, which can be introduced via the feed openings, in particular for (halo)butyl rubber products, include stabilizers, acid scavengers such as ESBO (epoxidized soybean oil), stearates such as calcium stearate, antioxidants and the like. Examples of suitable anti-oxidants include sterically hindered phenols such as butylated hydroxytoluenes and their derivates such as Irganox 1010 and 1076, amines, mercapto abenzimidazoles, certain phosphites and the like.

Alternately, or additionally, the additives can also be added to the polymer medium PM before it enters the degassing device or, if these are in liquid form, introduced into the extruder together with the stripping agent.

As the expert is aware, the radial clearance can be invariable or variable within the limits stated. It is also possible to shift a screw profile within the radial clearance.

Preferred materials for the production of screw elements are generally types of steel, in particular, nitriding steels, chrome, tool and stainless steels, as well as metallic compound materials manufactured using powder metallurgy and based on iron, nickel or cobalt. Others are nickel-based alloys and non-metallic materials such as ceramics.

In addition, the degassing device in accordance with the invention can also incorporate a pre-extruder or a pre-kneader upstream of the extruder, each designed as a degassing extruder or a degassing kneader.

Arrangements of this type are known in principle from EP 2 353 839 A or PCT/EP2011/054415.

In one embodiment of the degassing device, the transition zone connecting the degassing pre-extruder or the degassing pre-kneader to the (main) extruder can have at least one, preferably exactly one, tension release element such as, in particular, the nozzle plates as described above.

In another embodiment of the degassing device, the transition zone connecting the degassing pre-extruder or the degassing pre-kneader to the (main) extruder can incorporate at least one pressure control unit such as a throttle, which can be used to control the energy supply to the pre-extruder or pre-kneader.

This two-tier design of the degassing device allows a high degassing performance with a simultaneously high throughput of the medium containing elastomers.

If a degassing pre-extruder is used, its rotational speed is typically selected to be high, since the energy input is low due to the (still) low viscosity of the medium containing polymers to be degassed. This allows the proportion of volatile compounds to be reduced significantly before it is fed into the (main) extruder.

One or more concentrator units can be installed upstream from the degassing pre-extruder or degassing pre-kneader in order further to increase the degassing performance.

Concentrator units of this type can be flash vaporizers or cyclones, for example, which are well known in the prior art.

In one embodiment, a concentrator unit comprises at least:
- a heating device combined with a degassing tank, wherein the base part of the degassing tank is connected to a pump and the upper part of the degassing tank is connected to at least one gas discharge.
- a heating unit connected to the pump of the concentrator unit and the supply zone of the extruder or the pre-extruder or the pre-kneader.

In the context of this invention, the term "connected to" includes direct or indirect connections, wherein indirect connections can be achieved via tubes or hoses, for example. The term "connected to" also includes the option of arranging other units or devices between the units or devices, which are connected.

Corresponding concentrator units are adequately known from WO2010/031823 A.

Further features, advantages and details of the invention will follow from the description of the exemplary embodiments below.

The degassing device in accordance with the invention, including its embodiments described above and below, is particularly suited for use for a method of degassing media containing elastomers, for which reason another object of the invention is a method for the removal of volatile compounds from a medium containing elastomers (EM), which contains at least one elastomer and at least one volatile compound, which comprises at least the following steps:
a) feeding the medium containing elastomers (EM) into the degassing device in accordance with the invention, wherein this is performed in such a way that volatile compounds escape from the medium containing elastomers (EM) through the degassing vents of the degassing unit and the medium containing elastomers (EM) is thus depleted of volatile compounds, and, on its discharge from the degassing device, the polymer is obtained from the medium containing elastomers as the product P, which then has a lower proportion of volatile compounds than the medium containing elastomers (EM) fed into the degassing device, and preferably has a total content of volatile compounds of 1% w/w or less, preferably 0.5% w/w or less, and particularly preferably 0.1% w/w or less, based on the mass of the elastomer.

In accordance with the invention, media containing elastomers are media, which have at least one elastomer and at least one volatile compound.

Elastomers can be natural or synthetic elastomers, preferably those with a median molecular weight of more than 2,000 g/mol, particularly preferably more than 5,000 g/mol, and most preferably 20,000 to 2,000,000 g/mol.

Examples of natural and synthetic elastomers include styrene-butadiene rubbers such as solution styrene butadiene robber (SSBR) or emulsion styrene butadiene rubber (ESBR), natural rubbers (NR), butadiene rubbers (BR) such as neodymium butadiene rubber (NdBR), lithium butadiene rubber (LiBR) and cobalt butadiene rubber (CoBR), isoprene rubbers (IR), ethylene-propylene-diene rubbers such as ethylene-propylene-diene (M class) rubbers (EPDM), ethylene-propylene rubbers, nitrile rubbers such as acrylnitrile butadiene rubbers (NBR), hydrogenated nitrile rubbers (HNBR), butyl rubbers such as isobutene-isoprene rubber (IIR), halobutyl rubbers such as chlorine butyl rubber (CIIR) and bromobutyl rubber (BIIR) or ionomers produced from halo-butyl rubbers by conversion using amines or phosphines, preferably those, which can be obtained by converting BIIR using tertiary phosphines, chloroprene rubbers (CR), ethylene vinyl acetate rubbers (EVA and EVM), polyurethane rubbers, gutta-percha, fluoro rubbers, silicon rubbers, sulfide rubbers, chlorine-sulfonyl polyethylene rubbers, as well as any mixtures of the abovementioned elastomers.

In the context of this invention, the term butyl rubber refers to co-polymers of isobutene and at least one other co-monomer, whereby at least one co-monomer has conjugated double bonds. One preferred butyl rubber is a co-polymer of isobutene(2-methylpropene) and isoprene(2-methylbuta-1,3-diene), which is also called isobutene-isoprene rubber, or IIR for short. On a molar basis, the content of isoprene in the polymer is between 0.001 and 10 mol %, preferably between 0.5 and 8 mol %, and particularly preferably between 1.8 and 2.3 mol %. IIR consists of linear poly-isobutene chains with irregularly distributed isoprene units. The isoprene units introduce unsaturated positions into the polymer chain, which enables vulcanization. The mass-averaged molecular weight of IIR Mw is, for example, in the range of 50,000 to 1,000,000 g/mol, preferably from 300,000 to 1,000,000 g/mol.

The halogenated butyl rubbers CIIR and BIIR also contain a certain amount of halogen, which is chemically bound to the polymer. The amount of chemically bound halogen is usually in the range of more than 0 to 3% w/w relative to the total mass of the elastomer. The (halo)butyl rubbers might also contain additives, e.g. 0.0001 to 4 phr (phr=parts per hundred parts rubber relative to the rubber weight), epoxidized soybean oil (ESBO), 0.0001 to 5 phr calcium stearate and 0.0001 to 0.5 phr anti-oxidants. Other additives can also be used, depending on the application of the butyl rubber, i.e. filler material or coloring agent.

In the case of bromobutyl rubber BIIR, the typical bromine content in the finished product is 1.5 to 2.5% w/w, preferably 1.6 to 2.0% w/w.

In the case of chlorine-butyl rubber, the typical chlorine content in the finished product is 1.0 to 1.5% w/w, preferably 1.15 to 135% w/w.

The media containing elastomers to be used in accordance with the invention can be present, for example, in the form of suspensions, pastes, solutions, lumpy solid masses, crumbs or mixed forms of the abovementioned forms of appearance.

In the context of this invention, the term "volatile compounds" refers to compounds with a flashpoint of less than 250° C. at a pressure of 1013 hPa. Volatile compounds are, in particular, water and other volatile inorganic compounds, as well as volatile organic compounds. Volatile organic compounds are typically solvents used in polymerization or, in subsequent process steps, monomers or oligomers, which originate, for example, from the polymerization process or other organic compounds such as additives, for example. The medium containing elastomers EM, also referred to as cement, contains, for example, 3 to 98% w/w of an elastomer and 2 to 97% w/w volatile compounds, in particular, an organic solvent or an organic solvent and water, wherein the abovementioned components constitute up to 90 to 100% w/w, preferably to 95 to 100% w/w, of the total mass of the medium containing elastomers. The remaining part to 100% w/w can be, for example, non-organic or non-elastomer organic substances such as additives.

The organic solvent can be selected, for example, from the group consisting of linear or branched alkanes with 4 to 10 C atoms, preferably 4 to 7 C atoms. More preferred solvents are solvents containing or consisting of n-pentane, isopentane, n-hexane, cyclohexane, isohexane, methylcyclopentane, methylcyclohexane and n-heptane, as well as any mixtures containing or consisting of these alkanes.

In one embodiment, the medium containing elastomers EM fed into the extruder contains, for example, 30 to 98% w/w of an elastomer and 2 to 70% w/w volatile compounds, in particular, organic solvents or organic solvents and water, wherein the abovementioned components together constitute 90 to 100% w/w, preferably 95 to 100% w/w, of the total mass of the medium containing elastomers.

The medium containing elastomers EM fed into the extruder contains preferably 40 to 95% w/w of an elastomer and 5 to 60% w/w volatile compounds, in particular, organic solvents or organic solvents and water, wherein the abovementioned components constitute 90 to 100% w/w, preferably 95 to 100% w/w, of the total mass of the medium containing elastomers.

If the degassing unit incorporates a degassing pre-extruder, a degassing pre-kneader or a concentrator unit upstream of the extruder, the medium containing elastomers EM fed into the degassing pre-extruder, the degassing pre-kneader or the concentrator unit contains, for example, 10 to 95% w/w of an elastomer and 5 to 90% w/w volatile compounds, preferably 15 to 80% w/w of an elastomer and 20 to 85% w/w volatile compounds, and particularly preferably 15 to 70% w/w of an elastomer and 30 to 85% w/w volatile compounds, wherein the volatile components are, in particular, organic solvents or organic solvents and water, and wherein the abovementioned components together constitute 90 to 100% w/w, preferably 95 to 100% w/w, of the total mass of the medium containing elastomers.

It is clear to the expert that the volatile compound content of the elastomer medium EM is lower on entering the degassing pre-extruder or the degassing pre-kneader than on entering the downstream extruder. By analogy, this also applies to the volatile compound content of the medium containing elastomers EM on entering a concentrator unit upstream from a degassing pre-extruder or a degassing pre-kneader.

In this case, the medium containing elastomers EM fed into the concentrator unit contains preferably 5 to 80% w/w of an elastomer and 20 to 95% w/w volatile compounds, preferably 10 to 75% w/w of an elastomer and 25 to 90% w/w volatile compounds, wherein the volatile compounds are, in particular, organic solvents or organic solvents and water, wherein the abovementioned components constitute 90 to 100% w/w, preferably to 95 to 100% w/w, of the total mass of the medium containing elastomers.

In one embodiment of the invention, the extruders can either be heated via the housings to temperatures up to 300° C. or, alternately, be cooled.

In a preferred embodiment, the extruder comprises devices for operating separate zones at different temperatures independently of each other, so that the zones can either be heated, not heated or cooled.

Preferred extruder materials should not be corrosive and should, in principle, prevent any contamination of the medium containing elastomers for the product P with metal or metal ions.

Preferred extruder materials contain nitrided steel, duplex steel, stainless steel, nickel-based alloys, composite materials such as sintered metals, hot isostatic pressed materials, hard, abrasion-resistant materials such as stellites, metals coated with coatings consisting of, for example, ceramic, titanium nitride, chromium nitride and diamond-like carbon (DLC).

The gas vents of the degassing zones can be connected to a condensing system, and this is preferable.

In general, the purpose of the condensing system is to collect volatile compounds, which have been removed by the gas vents via the gas discharge lines, and this commonly comprises a condenser and a vacuum pump. Every condenser system known in accordance with the prior art can be used for the recovery of volatile compounds.

In general, feeding the condensed volatile compounds back into a process for the preparation of media containing elastomers is preferred, after performing a phase separation in order to separate the volatile organic compounds from water, if necessary.

There can be product processing devices downstream of the degassing device, which preferably have a cooling function.

Product processing devices with a cooling function include all such devices familiar to the expert for this purpose, such as pneumatic crumb conveyors with convective air cooling, vibrating crumb conveyors with convective cooling, vibrating crumb conveyors with cooled contact surfaces, belt conveyors with convective air cooling, belt conveyors with cooled belts, water spraying devices and underwater pelletizers, in which water is used as a coolant.

The product P can then be processed for final packaging and dispatch. (Halo)butyl rubber, for example, is cooled down to a temperature of or below 60° C., e.g. formed into bundles using a hydraulic press and then packed into boxes or crates for shipment.

In general, an increased feed rate of the medium containing elastomers EM into the feed zone of the extruder requires a corresponding increase in the extruder's rotational speed. Furthermore, the rotational speed determines the dwell time of the medium containing elastomers EM. Thus, the rotational speed, feed rate and extruder diameter are usually interdependent. Typically, the extruder is operated in such a way that the non-dimensional flow rate $V/n*d^3$ is set to approximately 0.01 to approximately 0.2, preferably to approximately 0.015 to approximately 0.1, where V is the volume flow rate, n is the rotational speed, expressed in revolutions per minute, and d is the effective diameter of the extruder. The maximum and minimum feed rates and rotational speeds are determined, for example, by the size of the extruder, the physical properties of the elastomer contained in the medium containing elastomers EM and the target values of the remaining volatile compounds in the elastomer. Based on these properties, however, the operating parameters can be determined by an expert with the aid of some initial experiments.

In one embodiment of the invention, the extruder is operated at a feed rate of 5 to 25,000, preferably 5 to 6,000, kilograms per hour.

In general, the degassing can be supported in the extruder, as well as in the pre-extruder or pre-kneader, by adding a stripping agent, which is removed along with the other volatile compounds. Even if the stripping agent can be added anywhere in the extruder unit in principle, it should preferably be added outside the degassing zones, e.g. in one or more of the pressure build-up zones or dispersing zones.

Suitable stripping agents are substances, which are inert with respect to the medium containing elastomers (EM) and have a vapor pressure of more than 100 hPa at 100° C.

In the context of the invention, the term "inert" means that the stripping agent does not or does not perceptibly undergo a chemical reaction with the polymers. Suitable stripping agents are nitrogen, carbon dioxide, noble gases, propane, butane, water or a mixture of the abovementioned substances. The amount of the stripping agent can be 0.0001 to 10% w/w, preferably 0.001 to 5% w/w, and more preferably 0.1 to 2% w/w, based on the amount of elastomer obtained at the discharge zone of the extruder.

The invention is described in greater detail with reference to the examples, as well as FIGS. 5 and 6 without, however, being restricted to these.

FIG. 5 depicts the extruder of the degassing device in accordance with the invention in longitudinal section and the upstream pre-extruder in cross-section.

FIG. 6 depicts the pre-extruder arranged upstream of the extruder, in longitudinal section.

EXAMPLES

Analytical Methods

Water content of the media containing polymers EM: The sample was placed in a centrifuge and was centrifuged for 5 minutes at 4000 rpm at room temperature. The water was then collected at the bottom of the tube and weighed.

Total concentration of volatile compounds: A sample of the product (P) was cut into small pieces, 2×2 mm in size. Approximately 30 g of the product was placed in an aluminum pot.

The weight of the pot and the product was determined precisely. The pot with the product sample was then placed in a vacuum oven at a vacuum level of 130 hPa for 60 minutes at a temperature of 105° C. After drying, the pot was placed in a desiccator and left to cool for 30 minutes. The pot was then weighed again. The weight loss was determined.

Residual solvent content in the product P: The residual solvent content in the product P was determined by means of vaporization chamber gas chromatography. A test sample (0.5±0.005 g) of the sample was placed into a vaporization chamber ampoule and a measured amount of solvent (1,2 dichlorobenzene, ODCB) was added. The ampoule was sealed and shaken until the product was dissolved. The ampoule was heated until the volatile organic compounds were distributed at equilibrium between the sample and the gas phase in the ampoule (vaporization chamber). A partial quantity of the vaporization chamber gas was injected into a carrier gas stream carrying the sample along a chromatography column. Standards of known composition were used to calibrate the GC. Toluene was added to the solvent for use as the internal standard.

Residual water content in the product P: The total amount of volatile compounds is the sum total of water, solvents and other volatile compounds. Since the proportion of other volatile compounds, such as monomers, was usually lower than 0.0005% w/w, the residual water content was able to be determined by subtracting the solvent content from the total content of volatile compounds.

The solvent content in the media containing elastomers EM was measured by means of gas chromatography. The internal standard was isooctane. The sample was diluted with toluene and then injected into the gas chromatograph. The gas chromatography was performed on an HP 6890 gas chromatograph with the following specifications:

Column type: DB-5 by J&W, length 60 m, diameter 0.23 mm, film thickness 1.0 μm

Injector temp.: 250° C.

Detector temp.: 350° C.

Carrier gas: helium

Column pressure: 96 kPa

Detector: FID

The following media containing elastomers EM were used for the examples below:

Preparation of EM-I

A crude solution of bromobutyl rubber was obtained from a commercial production plant and the organic phase was separated from the aqueous phase volume. The separation of the aqueous phase from the organic is known from WO2010/031823 A, in particular, from FIG. 7 and the corresponding description. The organic phase was then used as EM-I, for conducting the experiments. EM-I contained approximately 23% w/w bromobutyl rubber, approximately 74% w/w hexane isomers and 3% w/w water, calculated on 100% w/w of these three components. The concentration of the other additives relative to the mass of bromobutyl rubber was:

ESBO: 1 to 1.6 phr, calcium stearate: 1.3 to 1.7 phr and Irganox: 0.03 to 0.1 phr.

The elastomer and the volatile compounds thus constituted 97.55 to 98.30% w/w of the total mass of the medium containing elastomers.

After extrusion, the bromobutyl rubber obtained from EM-I had the following properties: Mooney (ML 1+8, 125° C.) 28 to 36, bound bromine content 1.6 to 2.0% w/w.

Example 1

Pre-Concentration

The Concentrator Unit

The concentrator unit used for the examples was similar to that described in WO2010/031823 A, in particular, in FIG. 1. A gear pump was used to pump the medium containing elastomers EM-I, which was prepared as described above, to the heating device. The heating device was a pipe-in-pipe type heat exchanger. Multiple pipes, which are heated internally by steam are housed in a cladding tube, which simultaneously receives the product. Mixing elements are also located on the outside of the inner pipes coming into contact with the product, which provide for a good heat transfer. The heating medium was steam, the flow rate of which was able to be controlled according to the set temperature of the medium. A pressure relief valve was installed in front of the concentrator unit and the pressure upstream of the valve was automatically regulated to a set value. This set value was selected so that boiling the heated medium containing elastomers EM-I in the heating device was prevented. The heated medium containing elastomers EM-I was conveyed into the degassing tank from above. The conical outlet of the degassing tank was equipped with a gear pump. The gear pump had the advantage that it was able to manage high viscosities and to build up high pressures. Samples were taken from the concentrated medium containing elastomers EM-II in order to analyze the concentration after the concentration step.

Example 1

The heating medium of the heating device was set at 160° C. so that the medium containing elastomers EM-I was heated to a temperature of 135° C. The pressure in the degassing tank was atmospheric. Atmospheric pressure means that the vaporized volatile components were transferred from the degassing tank via a condenser. The condenser was cooled with water, the condensed liquid components flowed into a collecting vessel, which was directly connected to the surroundings. This resulted in a pressure in the degassing tank, which was nearly identical to the ambient pressure. The concentrated medium containing elastomers EM-II at the outlet of the degassing tank was able to be conveyed from the concentrator unit by means of the extraction pump, as described above. The concentrated medium containing elastomers EM-II had a hexane concentration of approximately 43% w/w.

The Degassing Device (1)

The pre-concentrated EM-II was conveyed into the degassing device (1) via a heating device. The heating device was a heat exchanger of the same type that was used in the concentrator unit. The degassing device consisted of a pre-extruder (2), a twin-screw extruder, driven to rotate in opposite directions, with a bore diameter of D1=D2=57 mm and an effective length of 720 mm, and a main extruder (3), a twin-screw extruder, driven to rotate in the same direction, with a bore diameter of D1=D2=58.3 mm and an effective length of 3225 mm. Effective length in this case means the length in which contact with the product occurs.

Both extruders of the degassing device incorporated a control valve (5 and 5.1) as a pressure control device upstream from the respective feed zones (4 and 4.1) of the extruder and the pre-extruder.

The pre-extruder had a degassing zone (7.1) arranged downstream from the feed zone (4.1), in the conveying direction of the pre-extruder (6), and a degassing zone (7.R) arranged upstream from the feed zone (4.1) of the pre-extruder (6). The degassing zone (7.R) had a gas vent (8.R) with a degassing dome (9.R), which was connected to a gas discharge line. The degassing zone (7.1) had a gas vent (8.1) with a degassing dome (9.1), which was connected to a gas discharge line. A pressure build-up zone (10.1) and an accumulating element (11) were located downstream from the degassing zone (7.1), in the conveying direction of the pre-extruder (6).

After the accumulating element (11), a transfer zone (12) led to the main extruder (3). The transfer zone (12) consisted of a heated pipe, which opened into the inlet of the control valve (5), which, in turn, marked the beginning of the feed zone (4) of the main extruder (3).

The gas discharge lines of the pre-extruder (2) were connected to a suction unit and a condenser unit. The gases were extracted by means of a vacuum pump, from where the compressed gases were conveyed into a water-cooled condenser. The housing (13) of the pre-extruder was designed to be variably heated with steam.

The main extruder had three degassing zones (15.1, 15.2 and 15.3) arranged downstream from the feed zone (4) in the conveying direction of the extruder (14), and one degassing zone (15.R) arranged upstream from the feed zone (4) of the extruder (14). The degassing zone (15.R) had a gas vent (16.R) with a degassing dome (17.R), which was connected to a gas discharge line, each degassing zone (15.1, 15.2 and 15.3) had a gas vent (16.1, 16.2 and 16.3) with a degassing dome (17.1, 17.2 and 17.3), each of which was connected to a gas discharge line. The gas discharge lines were connected to a condenser unit consisting of a mechanical vacuum pump and a downstream water-cooled condenser. The gas discharge lines were connected to a condenser unit consisting of two mechanical vacuum pumps arranged one behind the other and a downstream water-cooled condenser.

Downstream from the degassing zone (15.1), in the conveying direction of the extruder (14), was a pressure build-up zone (18.1), and downstream again was a first dispersion zone (19.1).

Downstream from each degassing zone (15.2 and 15.3), in the conveying direction of the extruder (14), was also a pressure build-up zone (18.2 and 18.3). In turn, downstream from each pressure build-up zone (18.2 and 18.3) was a dispersion zone (19.2 and 19.3). Between the pressure build-up zones (18.1, 18.2 and 18.3) and the dispersion zones (19.1, 19.2 and 19.3), in each case, there was an accumulating element (20.1, 20.2 and 20.3), and downstream from each dispersion zone (19.1 and 19.2), in the conveying direction of the extruder (14), was a pair of split sieve plates (22.1 and 22.2), mounted on the housing (21) so as to be removable.

The discharge zone (23) from the extruder was located downstream from the last pressure build-up zone (18.3), in the direction of flow of the extruder (14). This discharge zone was formed by a fixed nozzle plate, which opened into an underwater granulator (24). Between the pressure build-up zone of the extruder (18.3) and the nozzle plate of the granulator (23), there was a slide valve, which allowed the product to be extruded via a bypass into a prepared receptacle, instead of conveying it into the underwater granulator through the nozzle plate. This bypass is mainly used for start-up and shutdown of the extrusion device.

In the region of the dispersion zones (19.1, 19.2 and 19.3), the extruder had inlet ports (25.1, 25.2 and 25.3) to feed in the stripping agents.

The housing consisted of multiple parts and was designed in such a way that it could be divided into three zones, which could be heated or cooled independently, so that the temperature profile in the extruder could be controlled, at least to an extent. Heating and cooling were effected using steam and cooling water.

The treatment elements used for the degassing, pressure build-up and dispersion zones and their specifications are indicated in the following examples.

Example 2

The pre-concentrated medium containing elastomers EM-II obtained from example 1 was conveyed into the degassing device via a heating device at a rate of 180 kg/h, resulting in approximately 80 kg/h of degassed dry product at the discharge zone (24) of the degassing device. Here, the steam supply to the heating device was adjusted in such a way that the temperature of PM-II at the control valve (5.1) was approximately 110° C. The pressure at the control valve was set to 1.3 MPa. The pressure in both zones of the pre-extruder was set to 400 mbar absolute. The heating temperature in the heated parts of the pre-extruder housing (13) was approximately 160° C. At the start of the transfer zone (4), the rubber proportion of the further concentrated medium containing elastomers EM-III was approximately 80% w/w. EM-III was then fed into the main extruder (3) in the feed zone (4) at a temperature of 100° C. and a pressure of approximately 2.0 MPa. The pressure in the transfer zone resulted from a completely open pressure control device in the feed zone of the main extruder.

Examples 3 to 6

The product EM-III, which was obtained in accordance with example 1 and example 2 and further concentrated, was introduced into the main extruder (3), where different screw elements were utilized in the degassing and dispersion zones.

The degassing zone (15.R) and the degassing zone (15.1) were operated at a pressure of approximately 100-180 mbar absolute. The pressure in the degassing zones (15.2 and 15.3) was set to approximately 50 mbar absolute. From a technological viewpoint, it is difficult to keep a constant vacuum pressure in such a process. As a result, fluctuations occur, which balance out during the trial run.

In the dispersion zone (19.1), which is arranged downstream from the degassing zone (15.1), nitrogen was introduced as a stripping agent at a rate of 0.5 to 0.6 kg/h.

In the dispersion zone (19.2), which is arranged downstream from the degassing zone (15.2), a dispersion of water and calcium stearate (45% w/w calcium stearate) was introduced at a rate of 3.6 kg/h.

In the dispersion zone (19.3), which is arranged downstream from the degassing zone (15.3), a dispersion of water and calcium stearate (45% w/w calcium stearate) was introduced at a rate of 3.6 kg/h.

The rotational speed of the extruder screws of the main extruder was between 60 min$^{-1}$ and 90 min$^{-1}$.

The screw elements used in the respective examples are summarized in table 2a).

TABLE 2a

Screw elements used

| Example | Degassing zones 15.1, 15.2 and 15.3 |
|---|---|
| 1 | Double-start standard Erdmenger profile analogous to FIG. 2b, with a center distance A increased by 0.5 mm |
| 2 | Double-start basic Erdmenger profile analogous to FIG. 2c, with a center distance A increased by 0.5 mm |
| 3 | Double-start basic Erdmenger profile analogous to FIG. 7 with a center distance A increased by 0.5 mm |

TABLE 2b

Radial clearances, free distances $A_{SF}$ and gap widths

| Example | Degassing zones 15.1, 15.2 and 15.3 |
|---|---|
| 1 | $R^1_{max\ n} = R^2_{max\ n} = 0.496\ D_n$, $A_{minSE} = 0.25$ mm, $A_{maxSE} = 0.25$ mm |
| 2 | $R^1_{max\ n} = R^2_{max\ n} = 0.463\ D_n$, $A_{minSE} = 0.25$ mm, $A_{maxSE} = 2.06$ mm |
| 3 | $R^1_{max\ n} = R^2_{max\ n} = 0.496\ D_n$, $A_{minSE} = 0.25$ mm, $A_{maxSE} = 2.6$ mm |

TABLE 2c

Results

| Example | Hexane content of product P [wt. ppm] | Total volatile substances incl. water [% w/w] |
|---|---|---|
| 1 (for comparison) | 2900 | <0.30 |
| 2 | 440 | <0.30 |
| 3 | 450 | <0.30 |

The examples indicate the following:

In example 1, only condition S2) is met, but not S1); the degassing result is unsatisfactory.

In the examples 2 and 3, both conditions S1) and S2) are met; the degassing result is very good.

What is claimed is:

1. A treatment and degassing device comprising at least one extruder, the extruder comprising:
   a housing and n housing bores $B_n$ with corresponding bore diameters $D_n$, where n is a whole number from 2 to 16, and wherein the housing bores intersect and are parallel to one another;
   n shafts $W_n$, configured to rotate 360° in the same direction and each of which is arranged concentrically in one of the housing bores $B_n$, each of which has a rotational axis $A_n$ and each of which is provided with at least one treatment element whose cross-sectional profile, in the peripheral direction, has:
   m relative maxima $R^m_{max\ n}$ in respect of the radial extension of the cross-section profile of the treatment element to the rotating axis $A_n$ of the shaft $W_n$, where m is a whole number from 1 to 16, wherein, in addition, at least one relative maximum $R^m_{max\ n}$ is an absolute maximum of the radial extension $R_{max\ n}$ in respect of the radial extension of the cross-sectional profile of the treatment element to the rotational axis $A_n$ of the shaft $W_n$, wherein:

$$R_{max\,n} <= (D_n/2),$$

at least one feed zone,
one or more degassing zones, each comprising at least one degassing vent, configured for discharging volatile components from a medium containing elastomers from the extruder,
at least one discharge zone,
wherein the treatment elements comprise screw elements SE, wherein:
a clearance $A_{SE}$ between profiles of the screw elements of two shafts, each of which is arranged concentrically in adjacent housing bores $B_n$ and $B_{n+1}$, is:
  i) from 0.001 to 0.2 $A_D$, wherein $A_D$ is the clearance between the rotational axes of the two adjacent shafts,
  ii) and has at least one absolute minimum $A_{minSE}$ and one absolute maximum $A_{maxSE}$, wherein $A_{maxSE}$ is $\geq 1.5\ A_{minSE}$.

2. The device in accordance with claim 1, wherein:
a cross-section profile of the screw elements has at least one absolute maximum $R_{max\,n}$ with respect to the radial extension of the profile curve, wherein:
$0.420\ D_n < R_{max\,n} < 0.496\ D_n$.

3. The device in accordance with claim 1 wherein:
the screw elements SE, as a modular design, consist of a core shaft and screw elements which have a locating socket for the shafts, or, as screws in a solid construction, or as screw shafts consisting of individual sub-segments manufactured as a solid construction;
the extruder comprises twin-screw extruders, planetary-gear extruders, or ring extruders; and
the extruder has at least one dispersion zone.

4. The device in accordance with claim 1, wherein:
the extruder comprises 1 to 20 degassing zones;
at least one degassing zone is upstream from the feed zone, in the conveying direction of the extruder; and
at least a last degassing zone of the extruder, in the conveying direction of the extruder comprises screw elements SE.

5. The device in accordance with claim 1, wherein the degassing zones further comprise at least one of gas vents and degassing domes configured to effectively prevent or reduce any leakage of medium containing elastomers therefrom.

6. The device in accordance with claim 1, wherein the gas vents have internal surfaces and the surfaces comprise coatings which prevent or reduce adhesion of the medium to the surface.

7. The device in accordance with claim 1, wherein the extruder further comprises:
expansion elements arranged upstream from the degassing zones, in the conveying direction of the extruder; and
one or more feed openings for introducing additives.

8. The device in accordance with claim 7, wherein the expansion elements comprise rotating or fixed perforated plates having multiple parts configured to allow for removal of the perforated plates from the housing without removing the shafts.

9. The device in accordance with claim 1,
wherein the screw elements SE are: two-start or three-start;
asymmetrical or symmetrical; and
made of steel or metallic composite materials manufactured using powder metallurgy based-on iron, nickel or cobalt.

10. The device in accordance with claim 1, further comprising:
a pre-extruder or pre-kneader arranged upstream from the extruder, each of which comprises a degassing extruder or a degassing kneader; and
a connecting transfer zone between the degassing pre-extruder or degassing pre-kneader and the extruder, wherein the transfer zone has at least one expansion element and at least one pressure control unit.

11. The device in accordance with claim 2, wherein:

$$A_{maxSE}\ \text{is}\ \geq 10.0\ A_{minSE};$$

$$0.450\ D_n < 0.480\ D_n;$$

the screw elements SE, as a modular design, consist of a core shaft and screw elements, which have a locating socket for the shafts, or, as screws in a solid construction, or as screw shafts consisting of individual sub-segments manufactured as a solid construction, and the screw elements SE are: two-start or three-start; asymmetrical or symmetrical; and made of nitrided steels, chromium steels, tool steels, stainless steels or metallic composite materials manufactured using powder metallurgy and based on iron, nickel or cobalt;
the extruder is a twin-screw extruders, and comprises:
  at least one dispersion zone;
  2 to 8 degassing zones, with at least one degassing zone upstream from the feed zone, in the conveying direction of the extruder, wherein all the degassing zones comprise:
    screw elements SE, and
    at least one of degassing domes and degassing vents, wherein the degassing vents comprise single-or multi-shaft plug screws mounted inside of the degassing vents to push medium containing elastomers or product back into the extruder, and internal surfaces with coatings which prevent or reduce adhesion of the medium or product to the surfaces;
  rotating or fixed perforated plate expansion elements arranged upstream from the degassing zones, in the conveying direction of the extruder, wherein the rotating or fixed perforated plates have two parts configured to allow for removal of the perforated plates from the housing without removing the shafts; and
  one or more feed openings for introducing additives; and the device further comprises:
one or more further concentrator units arranged upstream;
a degassing pre-extruder or degassing pre-kneader arranged upstream from the extruder; and
a connecting transfer zone between the degassing pre-extruder or degassing pre-kneader and the extruder, wherein the transfer zone comprises:
  one perforated plate expansion element; and
  at least one throttle to control pressure.

12. A method for removing volatile compounds from a medium containing elastomers (EM) containing at least one elastomer and at least one volatile compound, the method comprising:
conveying the medium containing elastomers (EM) into a degassing device in accordance with claim 1,
operating the degassing device in such a way that volatile compounds from the medium containing elastomers (EM) can escape through the degassing unit, thus reducing the content of the volatile compounds in the medium containing elastomers (EM), and discharging from the degassing device, a polymer obtained from the medium containing elastomers as the product P, having a lower proportion of volatile compounds than the medium containing elastomers (EM) conveyed into the degassing device, and a total volatile compound content of 1% w/w or less based on the mass of the elastomer.

13. The method in accordance with claim 12, wherein the medium containing elastomers (EM) contains at least one natural or synthetic elastomer having a mean molecular weight of greater than 2,000 g/mol.

14. The method in accordance with claim 12, wherein the medium containing elastomers (EM) comprises styrene-butadiene, natural rubbers (NR), butadiene rubbers (BR), isoprene rubbers (IR), ethylene-propylene-diene rubbers, ethylene-propylene rubbers, nitrile rubbers, hydrogenated nitrile rubbers (HNBR), butyl rubbers, halo-butyl rubbers, or ionomers produced from halobutyl rubbers by conversion using amines or phosphines, chloroprene rubbers (CR), ethylene vinyl acetate rubbers (EVA and EVM), polyurethane rubbers, gutta-percha, fluoro rubbers, silicone rubbers, sulfide rubbers, chloride-sulfonyl polyethylene rubbers, as well as any mixtures of the abovementioned elastomers.

15. The method in accordance with claim 12, wherein the medium containing elastomers (EM) contains butyl rubber and/or halogenated butyl rubbers.

16. The method in accordance with claim 12, wherein the medium containing elastomers (EM) contains 3 to 98% w/w of an elastomer and 2 to 97% w/w volatile compound wherein the abovementioned components constitute up to 90 to 100% w/w of the total mass of the medium containing elastomers (EM).

17. The method in accordance with claims 12, wherein the degassing zones further comprise at least one of gas vents and degassing domes configured to effectively prevent or reduce any leakage of medium containing elastomers therefrom, and the method further comprises maintaining a pressure in the degassing vents and the degassing domes between 1 hPa and 2,000 hPa.

18. The method in accordance with claims 12, wherein the device further comprises a degassing pre-extruder or degassing pre-kneader upstream from the extruder, and the method further comprises introducing stripping agents into the extruder of the degassing device or the pre-extruder or pre-kneader.

19. The method in accordance with claim 12, wherein:
the degassing zone further comprise at least one of gas vents and degassing domes configured to prevent or reduce leakage of medium containing elastomers therefrom, and the method further comprises maintaining a pressure in the degassing vents and the degassing domes between 1 hPa and 2,000 hPa;

the device further comprises a degassing pre-extruder degassing pre-kneader upstream from the extruder, and the method further comprises introducing stripping agents into the extruder of the degassing device or the pre-extruder or pre-kneader;

the medium containing elastomers (EM) is a suspension, paste, melt, solution, lumpy solid masse, or combination thereof, and contains 3 to 98% w/w of an elastomer and 2 to 97% w/w volatile compounds including organic solvent and water, wherein the above-mentioned components constitute 95 to 100% w/w, of the total mass of the medium containing elastomers (EM), and the elastomer comprises at least one natural or synthetic elastomer having a mean molecular weight of 20,000 to 2,000,000 g/mol; and the polymer obtained as the product P has a total volatile compound content of 0.1% w/w or less, based on the mass of the elastomer.

20. The method in accordance with claim 19, wherein the elastomer is butyl rubber and/or halogenated butyl rubbers.

* * * * *